(12) United States Patent
Herzog

(10) Patent No.: US 6,557,892 B2
(45) Date of Patent: May 6, 2003

(54) AUTOMOTIVE SIDE-IMPACT PROTECTION SYSTEM

(75) Inventor: Frank Herzog, Plüderhausen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/726,669

(22) Filed: Nov. 29, 2000

(65) Prior Publication Data

US 2001/0038197 A1 Nov. 8, 2001

(30) Foreign Application Priority Data

Dec. 6, 1999 (DE) .......................... 299 21 414

(51) Int. Cl.⁷ .............................. B60R 21/22
(52) U.S. Cl. ....................... 280/743.2; 280/730.2
(58) Field of Search ................ 280/728.2, 730.1, 280/730.2, 733, 743.2, 743.1, 749

(56) References Cited

U.S. PATENT DOCUMENTS

| | | | | |
|---|---|---|---|---|
| 6,095,551 A | * | 8/2000 | O'Docherty | 280/730.2 |
| 6,135,493 A | * | 10/2000 | Jost et al. | 280/730.2 |
| 6,152,481 A | * | 11/2000 | Webber et al. | 280/730.2 |
| 6,224,091 B1 | * | 5/2001 | Eyrainer et al. | 280/730.2 |
| 6,276,712 B1 | * | 8/2001 | Welch et al. | 280/730.2 |
| 6,367,836 B1 | * | 4/2002 | Tanase et al. | 280/730.2 |
| 6,412,810 B1 | * | 7/2002 | Wipasuramonton et al. | 280/730.2 |

FOREIGN PATENT DOCUMENTS

| | | |
|---|---|---|
| DE | 296 13 781 U1 * | 11/1996 |
| DE | 19654490 A1 | 6/1998 |
| EP | 0814001 A1 | 12/1997 |
| EP | 0924122 A1 | 6/1999 |
| EP | 0940304 A2 | 9/1999 |
| EP | 0978421 A1 | 2/2000 |
| GB | 2327066 A | 1/1999 |

* cited by examiner

Primary Examiner—Paul N. Dickson
Assistant Examiner—David R. Dunn
(74) Attorney, Agent, or Firm—Tarolli, Sundheim, Covell & Tummino L.L.P.

(57) ABSTRACT

In an automotive side-impact protection system an inflatable elongated cushioning bag is tensioned between two fixed points in a vehicle. One of the tensioning straps is branched at the one of its ends facing the cushioning bag into two tensioning strap sections, engaging the cushioning bag at two different levels.

5 Claims, 2 Drawing Sheets

AUTOMOTIVE SIDE-IMPACT PROTECTION SYSTEM

FIELD OF INVENTION

The invention relates to an automotive side-impact protection system comprising an inflatable elongated cushioning bag having a pair of tensioning straps for tensioning the bag in an inflated condition between the two fixed points in a vehicle.

BACKGROUND OF THE INVENTION

In such a protection system the inflated cushioning bag extends from the roof edge of the vehicle downwards to the door shoulder line as well as between the A pillar and C pillar of the vehicle so that both the side windows as well as the B pillar are surface covered. The general intention is to tension the inflated cushioning bag between a point at the bottom end of the A pillar and a point on the C pillar so as to cushion transverse forces produced by the side-impact, on the one hand, and, on the other hand, to promote deployment of the cushioning bag. Since in its resting condition the cushioning bag is stowed away in the vehicle with the front and rear tensioning strap along a curved roof edge whilst the lower edge portion of the cushioning bag in the inflated condition is substantially straight, however, tensioning the inflated cushioning bag in the vehicle is attainable only by special means. It has already been proposed to divide the gas bag into several chambers extending parallel and perpendicular so that the curvatures of the individual chambers result in a natural shortening of the cushioning bag longitudinally. Experience has shown, however, that this shortening is not sufficient to effectively tension the cushioning bag in the vehicle. It has also been proposed to apply an active tensioning by, e.g. pyrotechnically activated tensioning means like those of a belt retractor. The engineering of this solution is, however, highly complicated.

BRIEF SUMMARY OF THE INVENTION

The invention provides an automotive side-impact protection system which assures the desired tensioning of the inflated cushioning bag in the vehicle by very simple means in making use of existing geometry. According to the invention at least one of the tensioning straps is branched at its end facing the cushioning bag into two tensioning strap sections engaging the inflated cushioning bag at different levels. In the resting condition of the cushioning bag these two tensioning strap sections lie on top of each other according to the contour of the roof edge, along which the tensioning straps are stowed with the folded cushioning bag. On deployment and expansion of the cushioning bag the two tensioning strap sections are splayed, however, since they are joined to each other at the end of the tensioning strap and connected to the inflated cushioning bag at different levels. This splaying of the two tensioning strap sections produces a shortening of the effective tensioning line by roughly half the length of a tensioning strap section. It is this shortening of the effective tensioning line that is made use of to tension the inflated cushioning bag between two fixed points in the vehicle.

This shortening of the effective tensioning line achieved in this way is all the more effective, the greater the angle formed by the two tensioning strap sections to each other in the inflated condition of the cushioning bag. In the preferred embodiment the tensioning strap sections thus form between them an obtuse angle in the tensioned condition. However, a useful shortening is also possible with smaller angles, although the angle should not be less than 45°.

The shortening of the effective tensioning line achieved by the invention is also all the more, the longer the two tensioning strap sections are. This is why in the preferred embodiment the end of one of the tensioning strap sections is connected to the lower edge portion of the inflated cushioning bag and the end of the other tensioning strap section engages the inflated cushioning bag roughly in the middle or even higher.

BRIEF DESCRIPTION OF THE DRAWINGS

Further advantages and features of the invention become apparent from the following description of a preferred embodiment as evident from the drawings to which reference is made and in which.

DETAILED DESCRIPTION OF THE INVENTION

Figure 1:
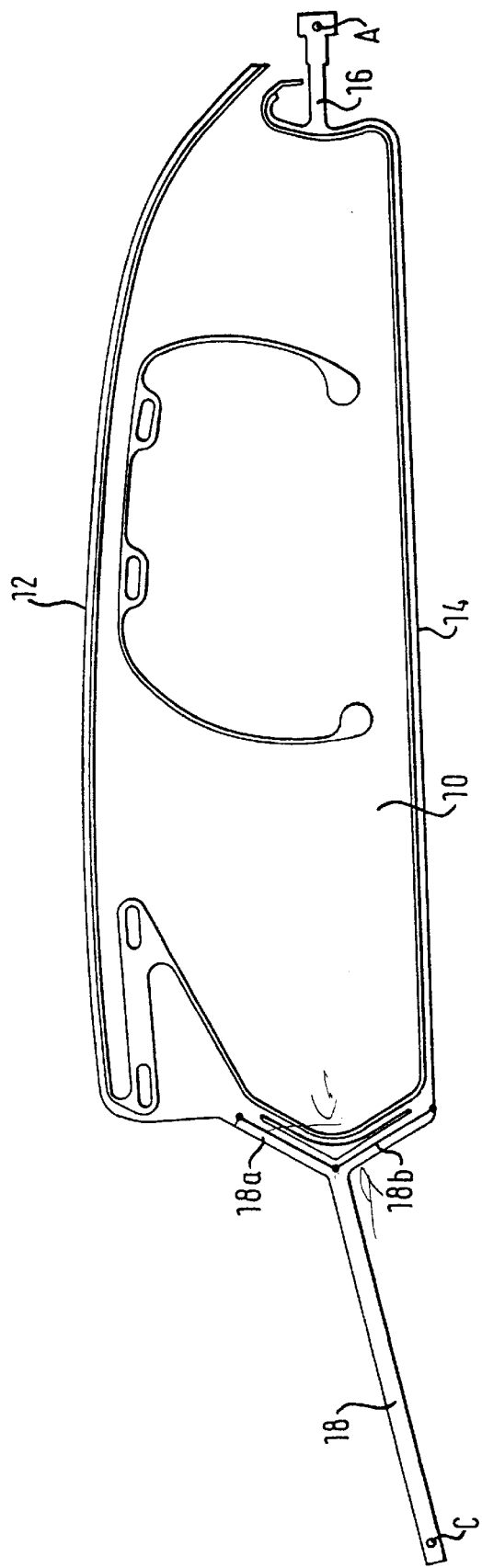
FIG. 1 is a schematic side view of an inflated cushioning bag tensioned by means of tensioning straps in the vehicle.

Referring now to FIG. 1 there is illustrated the cushioning bag 10 in the inflated condition extending from the curved upper roof edge 12 of the vehicle downwards to a lower edge portion 14 and longitudinally between the A pillar and C pillar of the vehicle. Such a cushioning bag, also termed inflatable curtain, covers the side windows of the vehicle and its B pillar when inflated. The front end of the cushioning bag 10 is secured by means of a first tensioning strap 16 to a point designated A on the A pillar of the vehicle. The rear end of the cushioning bag 10 is secured by means of a second tensioning strap 18 to a point designated C on the C pillar of the vehicle. This tensioning strap 18 is branched at its end facing the cushioning bag 10 into two tensioning strap sections 18a, 18b. The free end of the upper tensioning strap section 18a is joined to the inflated cushioning bag 10 roughly in the middle of its vertical dimension. The free end of the lower tensioning strap section 18b engages the lower edge portion 14 of the inflated cushioning bag 10. In the inflated condition of the cushioning bag 10 the tensioning strap sections 18a, 18b form between them an obtuse angle.

Figure 2:
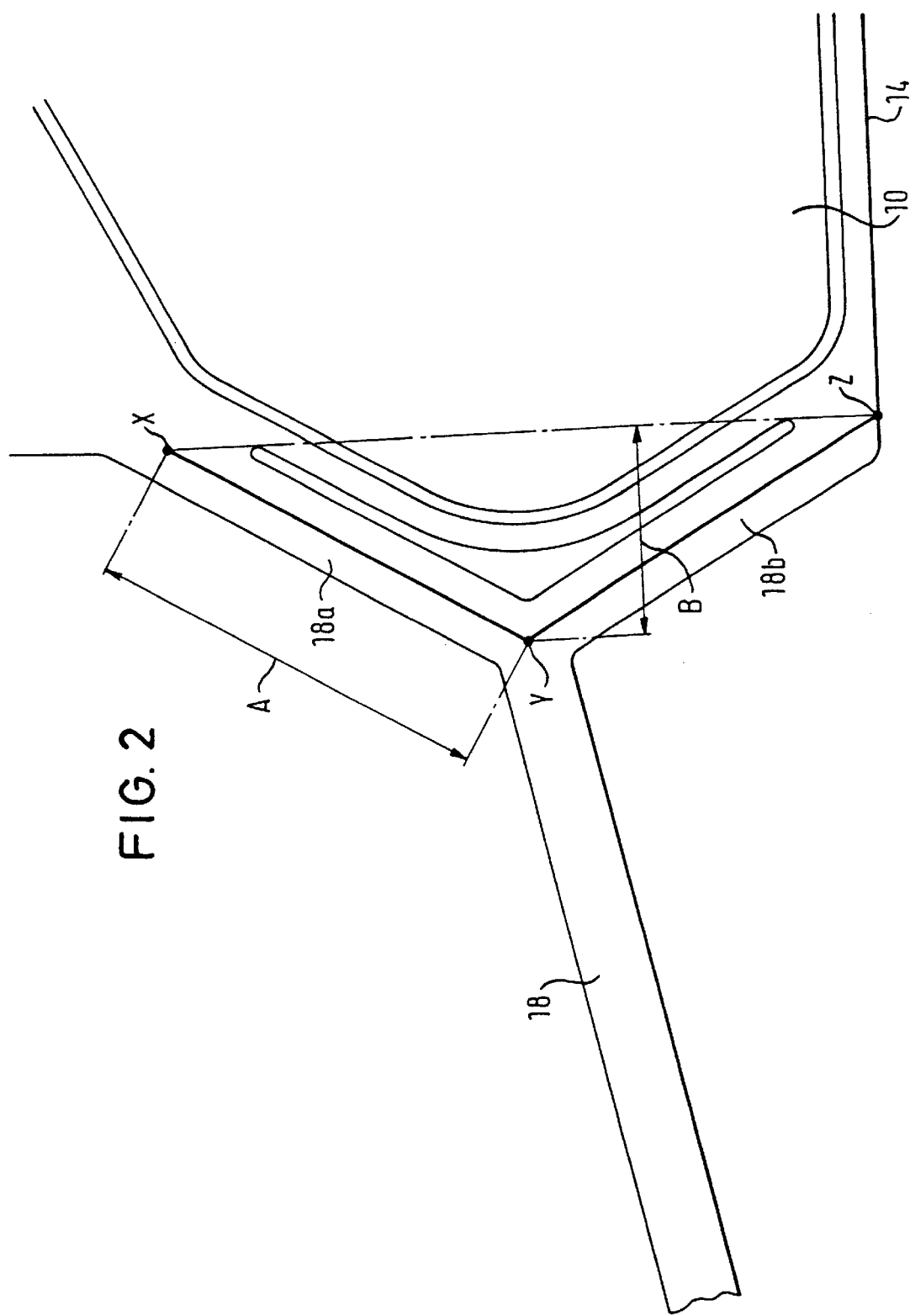
FIG. 2 is a detail on a magnified scale to explain the operation of the invention.

To explain the operation, reference is now made to FIG. 2.

In the resting condition of the protection system the cushioning bag 10 including the tensioning straps 16, 18 is stowed along the curved roof edge 12 of the vehicle. The tensioning strap sections 18a, 18b lie on top of each other in the elongation of the tensioning strap 18. In the embodiment as shown the length A of the tensioning strap section 18a has roughly the same length as the tensioning strap section 18b. At the point Y the tensioning strap sections 18a, 18b are connected to each other and to the tensioning strap 18. The free end of the tensioning strap section 18a is joined to the point X of the cushioning bag 10. The free end of the tensioning strap section 18b is joined at point Z to the lower edge portion 14 of the cushioning bag 10. In the inflated condition the connecting point Y has the distance B from the line X–Z connecting the joining points of the tensioning strap sections 18a, 18b on the cushioning bag 10. Due to the geometry involved this distance B amounts to only roughly half the length A of each tensioning strap section 18a, 18b. As a result, the desired shortening of the effective tensioning line by the amount A–B occurs due to the splaying of the tensioning strap sections 18*a*, 18*b* when the cushioning bag 10 is inflated.

At one end of the cushioning bag 10 a simple tensioning by means of the tensioning strap 16 may be sufficient. However, if need be, here too an arrangement like the tensioning strap 18 having the two tensioning strap sections 18*a*, 18*b* may be provided.

What is claimed is:

1. A side-impact protection system for use in motor vehicles, comprising an inflatable elongated cushioning bag having a pair of tensioning straps for tensioning the bag in an inflated condition between two fixed points in a vehicle, at least one of said tensioning straps having an end facing said cushioning bag and branched into two tensioning strap sections engaging said inflated cushioning bag at different levels with respect to height of the vehicle.

2. The side-impact protection system as set forth in claim 1, wherein said two tensioning strap sections define an obtuse angle when tensioned.

3. The side-impact protection system as set forth in claim 1, wherein one of said tensioning strap sections engages a lower edge portion of said inflated cushioning bag.

4. The side impact protection system as set forth in claim 3, wherein another one of said tensioning strap sections engages said inflated cushioning bag substantially in the middle or above the middle of the height of said inflated cushioning bag.

5. The side-impact protection system as set forth in claim 3, wherein an end of said tensioning strap facing away from said cushioning bag is secured to said vehicle substantially at the level of lower edge portion of said inflated cushioning bag.

* * * * *